United States Patent [19]

Gayman

[11] Patent Number: 4,757,673
[45] Date of Patent: Jul. 19, 1988

[54] ADJUSTMENT OF CROP DIVIDERS

[76] Inventor: Charles Gayman, Smithshire, Ill. 61478

[21] Appl. No.: 890,365

[22] Filed: Jul. 29, 1986

[51] Int. Cl.⁴ .................... A01D 63/04; A01D 45/02
[52] U.S. Cl. .......................... 56/314; 56/119; 56/208; 172/502; 172/504
[58] Field of Search ................. 56/314, 119, DIG. 15, 56/208, 10.2; 172/502, 504

[56] References Cited

U.S. PATENT DOCUMENTS

| | | | |
|---|---|---|---|
| 1,545,564 | 7/1925 | Krotz | 172/504 |
| 1,807,731 | 6/1931 | Ehricke | 172/502 |
| 2,185,634 | 1/1940 | Jacobs et al. | 172/504 |
| 3,349,549 | 10/1967 | Van Der Lely | 56/314 |
| 3,967,439 | 7/1976 | Mott | 56/314 |
| 4,191,006 | 3/1980 | Kerber et al. | 56/208 |
| 4,193,250 | 3/1980 | Kessens et al. | 56/314 |
| 4,206,583 | 6/1980 | Week et al. | 56/208 |
| 4,330,984 | 5/1982 | Hillmann | 56/314 |
| 4,333,304 | 6/1982 | Greiner et al. | 56/119 |
| 4,538,404 | 9/1985 | Heimark, Jr. et al. | 56/314 |

OTHER PUBLICATIONS

Operating Instructions for Combine, pp. 15 and 16, "Operating the Row-Crop Head".

Primary Examiner—Paul J. Hirsch
Assistant Examiner—Vincent Ciamacco
Attorney, Agent, or Firm—Nixon & Vanderhye

[57] ABSTRACT

A tool, and method of utilization, for achieving fine vertical adjustment of a crop divider pivotally mounted on the front of a crop header. The tool includes an inverted J-shaped support member adapted for attachment to a frame member of the crop header. Rotatably secured to the support member is an elongated screw member to which is threadably mounted for axial movement an annular ring. The tool is mounted such that a coarse adjusting chain, which normally extends between the crop row divider and crop header, passes through the annular ring. By rotating the elongated screw, the ring moves axially in a direction generally perpendicular to the normal orientation of the chain to alter its effective length, causing the crop row divider to pivot about its mounting and thereby adjust its vertical position relative to the ground.

29 Claims, 2 Drawing Sheets

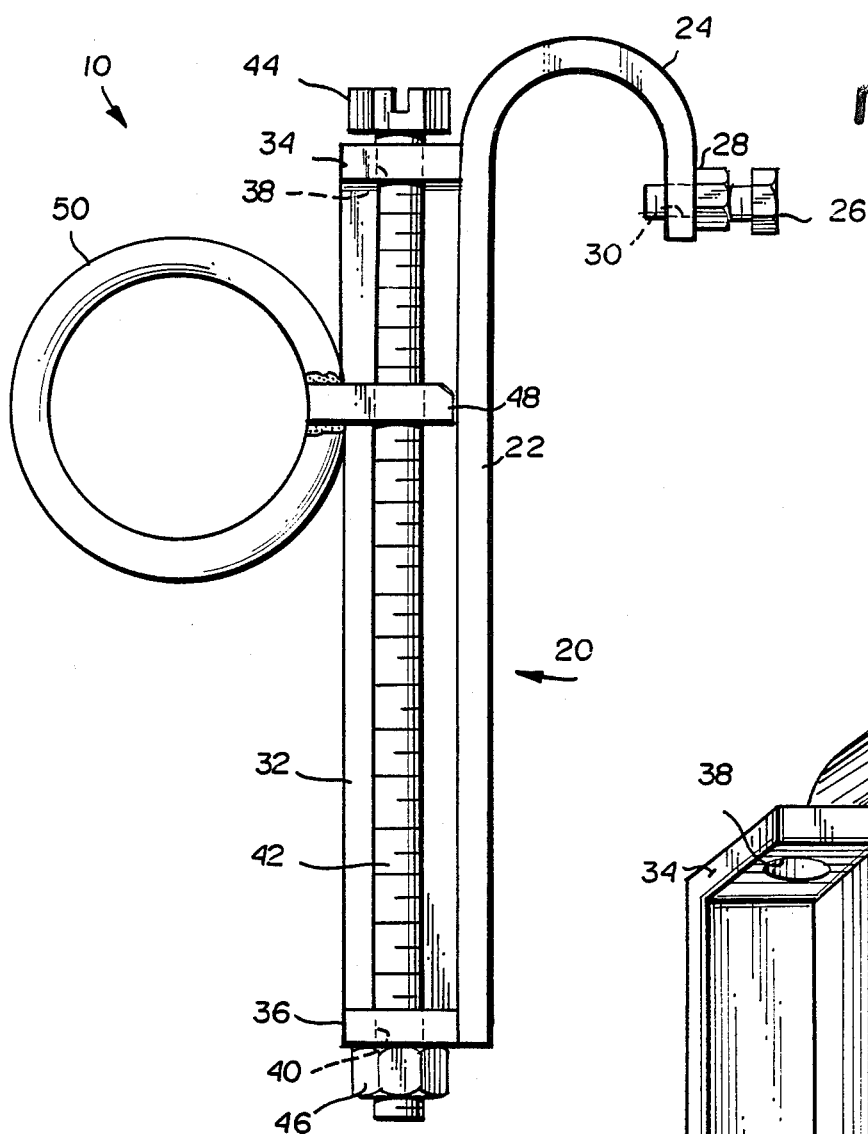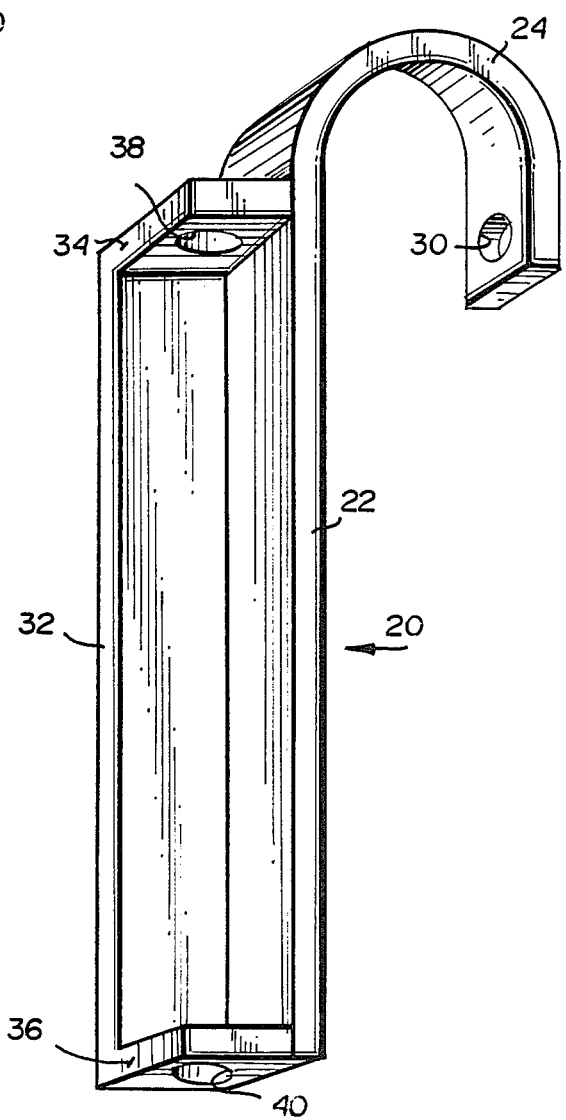

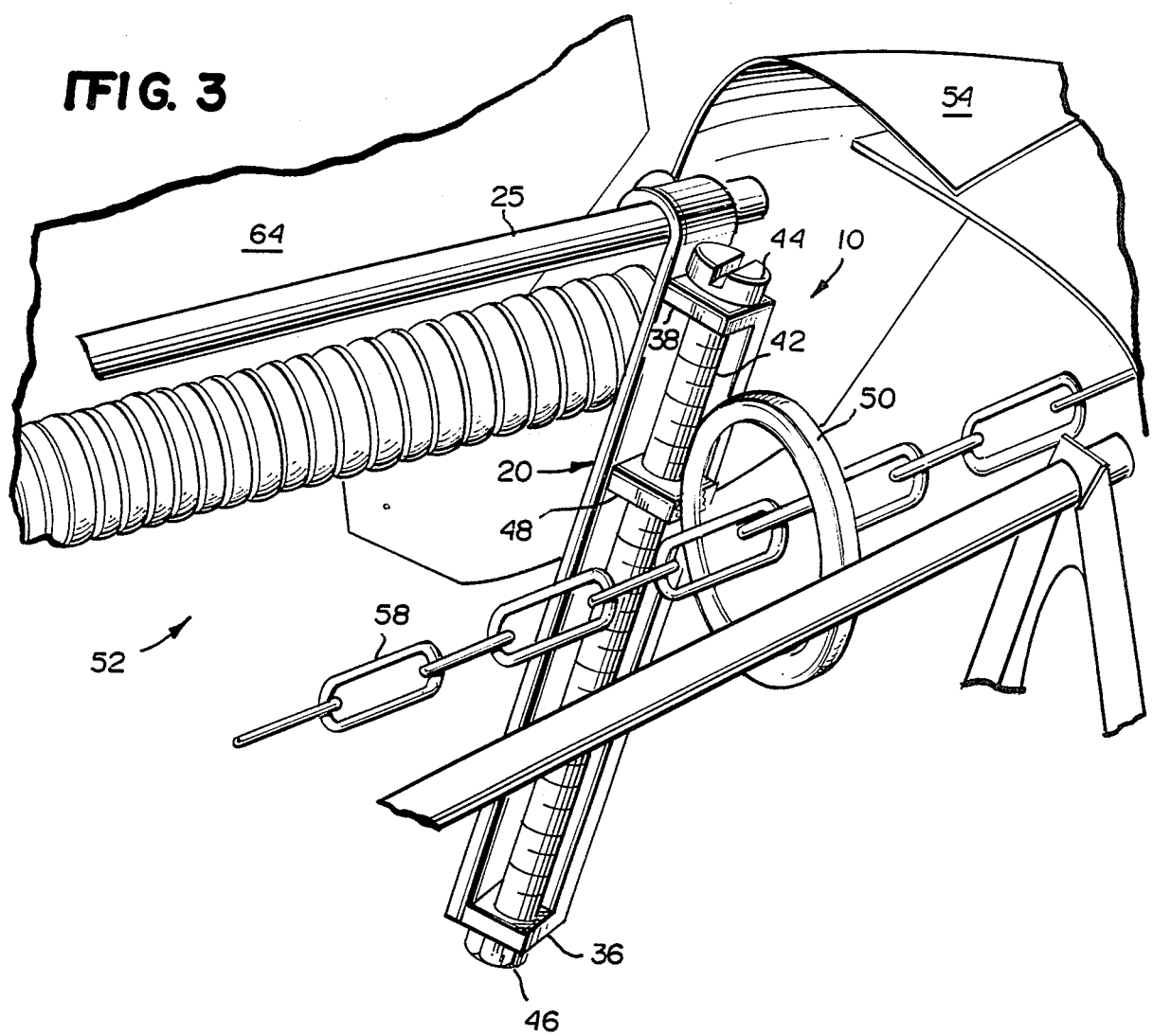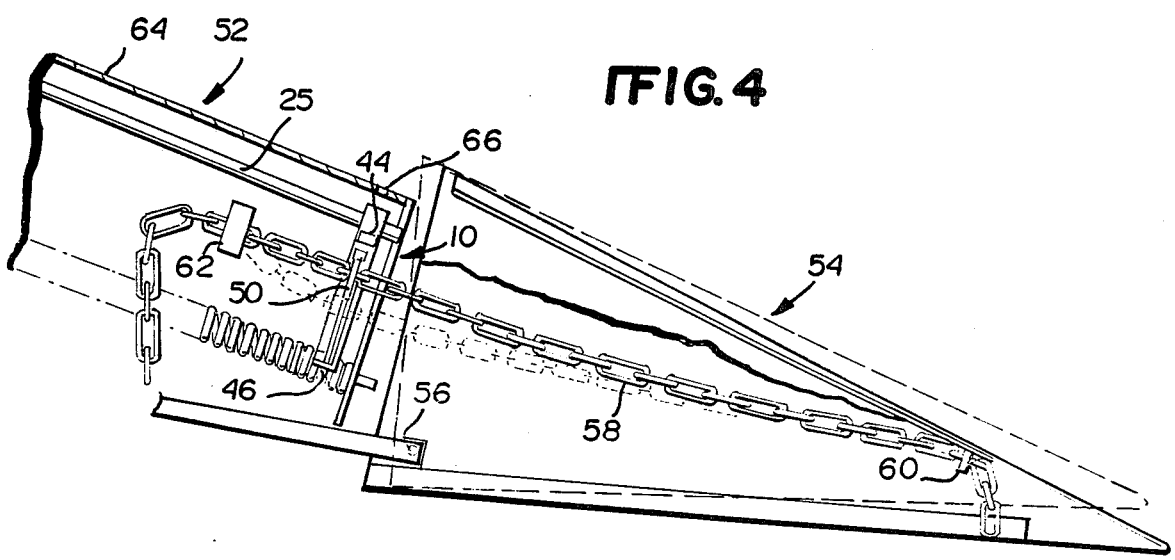

ADJUSTMENT OF CROP DIVIDERS

BACKGROUND OF THE INVENTION

This invention relates to agricultural harvesting machinery and, in particular, to an adjustable crop divider that is provided on the front end of a crop processor or header unit mounted transversely at the front of a mechanical harvester or combine. While there are many headers or crop processors for performing a variety of functions, for simplicity sake, the invention here will be discussed with reference generally to a crop header for a combine. Those skilled in the art will appreciate that the invention can be utilized with a variety of harvester and header configurations.

A crop divider is a device positioned at the front of a header unit to divide the crop into rows, consistent with the design and capacity of the header, by deflecting the stalks of the crop as the combine proceeds through the field. If, for example, the header is designed for harvesting six rows of corn simultaneously, seven crop dividers are required across the front of the header.

Typically, a crop divider has a forward facing pointed end for engaging the crop, and a rearward portion pivotally mounted to the header which permits the divider to be raised or lowered in a vertical arc in order to compensate for changing terrain contours. Typically, a manual height adjustment chain extends from the forward end of the divider to an attachment location on the header. By changing the effective length of the chain, the divider is caused to swing about its pivotal mounting to either raise or lower the front end of the divider. Manual adjustment of individual dividers, however, is a time consuming and tedious task, particularly as crop processors of greater capacity, i.e., able to process more rows of crops, are being designed. Manual adjustment of each crop divider requires the header unit to be raised and the operator to crawl under the header to raise or lower each divider individually by adjusting the chain at its point of attachment to the header.

To overcome time consuming manual adjustment, it has been proposed to use sensors to effect automatic height adjustment of the header and divider units. See, for example, U.S. Pat. No. 4,193,250. However, such arrangements are expensive, costly to maintain, and oft times unable to be repaired in the field.

SUMMARY OF THE INVENTION

The present invention relates to an improvement in manual adjustment-type crop dividers which employ chains extending between the front ends of the dividers and attachment locations on the crop header unit. Specifically, the present invention provides a method and device for achieving precise, fine adjustment of the height of a crop divider by acting directly on the coarse adjustment member, i.e., the chain, of conventional divider and header units. In addition, the design of the present invention enables the operator of the combine to make such fine adjustments without having to raise the header unit. Access to the device is directly through the top of the header housing and adjustments are made simply and quickly with a conventional screw driver.

The device of the present invention includes a generally elongated support member which can be attached to a frame member of the header so that the device extends downwardly in a direction generally perpendicular to a divider chain which extends longitudinally of the divider, i.e., parallel to the direction of movement of the combine. The support member mounts an adjustment screw which extends parallel to the support member and which, in turn, threadably mounts an adjusting nut which is constrained against rotation. The adjusting nut is free, however, to move axially upwardly or downwardly along the screw as the latter is rotated. Fixedly secured to the adjusting nut is a chain engaging member, such as a ring, which moves with the nut. The device is mounted on the header frame member so that the screw head is easily engaged by a screw driver passing through an existing access hole on the header housing. In use, the course adjusting chain passes through the ring of the subject invention device and, as the adjusting screw is rotated, the chain is caused to move upwardly or downwardly with the ring, to alter the effective length of the chain. In this manner, quick and precise vertical adjustment of the crop divider is achieved. It is understood that a device in accordance with the invention is provided for each crop divider on the header unit.

BRIEF DESCRIPTION OF THE DRAWINGS

FIG. 1 is a side view of a crop divider height adjustment device in accordance with an exemplary embodiment of the invention;

FIG. 2 is a perspective view of the device as shown in FIG. 1 with the adjusting screw and nut removed;

FIG. 3 is a perspective view of the adjustment device of FIG. 1 mounted in place on a header frame member; and FIG. 4 is a side view, partly in section, of the adjustment device of FIG. 1 mounted in place and illustrating how the adjustment device operates to raise the front end of the row divider.

DETAILED DESCRIPTION OF THE DRAWINGS

Referring to FIG. 1, the crop divider height adjustment device 10 according to an exemplary embodiment of this invention is shown to include a supporting member 20 formed in part by an inverted J-shaped strap 22 which may be constructed of suitably strong metal such as steel. The curved or hook-like portion 24 of the strap 22 is adapted for attachment to a frame member 25 of a header unit and to be secured thereto by any conventional means such as by a fastener 26 threadably received in a bore 30 formed in the strap 22. The fastener may be locked in place against the frame member 25 by a nut 28. Fixedly secured to the strap 22 by any suitable means, such as by welding, is a second, C-shaped strap 32 which is also preferably steel. End walls 34 and 36 are provided with smooth bores 38, 40 which are aligned and adapted to receive an adjustment screw, or bolt, 42 as explained more fully hereinbelow.

An adjusting screw, or bolt, 42 is mounted so as to extend through smooth bores 38 and 40 in the end walls 34, 36 respectively. At the lower end of the screw 42, extending beyond the wall 36, there is threadably secured a nut 46 for preventing accidental axial movement of the screw out of the aligned bores 38, 40.

Threadably received on the adjusting screw 42 is an adjusting nut 48 to which is fixedly secured, by welding for example, a chain engaging and connecting ring 50. The ring 50 is particularly advantageous because it permits axial movement of the chain therethrough during course or rough adjustment of the chain, and yet is effective to transmit the forces necessary to effect precise vertical adjustment in a manner described more fully hereinbelow.

It can be seen from FIGS. 1 and 2 that the nut 48 fits snugly within the corner formed by straps 22, 32 so that it cannot rotate but is free to move axially upwardly or downwardly along the screw 42.

In assembling the various component parts of the device described, it will be readily apparent to those skilled in the art that after the adjusting screw 42 is passed through bore 38, the adjusting nut 48 and ring 50 must then be threaded onto the screw. The free end of the screw may then be passed through bore 40 and nut 46 affixed thereto to hold the screw in place. The screw 42 and nut 46 may be rotated by a reverseable motor controlled from the combine cab.

Turning to FIGS. 3 and 4, the adjusting device 10 of this invention is shown mounted in place on a frame member 25 of a crop processor or header 52. As best illustrated with reference to FIG. 4, the crop row divider 54 is pivotally mounted to a header unit 52 at 56 in a manner well know to those of ordinary skill in the art. An elongated, flexible adjustment member, such as chain 58, is secured to the crop row divider at 60 and extends rearwardly thereof to a location 62 where it is adjustably mounted by any well known means, such as by a slot and cotter pin arrangement.

The device 10 of this invention is mounted on the frame member 25 of the header unit 52 so as to extend in a direction generally perpendicular to the chain 58. The device is secured to the frame 25 by tightening screw fastener 26.

After installing the device 10, the coarse adjustment chain is passed through the ring 50 and secured in place at the coarse adjustment location 62. When the header housing panel 64 of the header unit 52 is closed, easy access to the screw head 44 is permitted through an aperture 66 provided in the panel. The overall interrelationship of the height adjustment device of this invention, the crop divider and crop header is illustrated by the solid line configuration in FIG. 4.

In operation, the combine operator initially sets the coarse vertical adjustment of each crop row divider on the front of the header unit by adjusting the chain 58 in the conventional manner. As further adjustments become necessary during the course of operation of the combine, individual, fine vertical adjustments to the row divider may be made by engaging screw head 44 with a conventional screw driver and rotating the screw 42 to cause, for example, downward movement of the ring 50. Because chain 58 is constrained to move downwardly with the ring, its effective length is shortened, causing the row divider nose to lift upwardly about pivot 56. This upward adjustment of the nose of the divider is illustrated in FIG. 4 by the phantom line configuration. Subsequent rotation of the screw in the opposite direction would obviously result in a lowering of the row divider nose. This procedure is repeated for each crop divider associated with a crop header.

Thus, quick and easily accomplished precise vertical adjustment of a crop divider is achieved through utilization of the apparatus and method disclosed herein.

It will be understood that the invention is not limited to the specific embodiments disclosed in the drawings. Various modifications to the shape, size and arrangement of parts will be apparent to those of ordinary skill in the art, which modifications will nevertheless remain within the scope of the invention as defined in the claims which follow.

What is claimed:

1. A device for fine vertical adjustment of a crop divider pivotally mounted on a crop processing header, said device comprising:
    a support member adapted for attachment to a frame member on the crop processing header;
    a screw member freely rotatably mounted on said support member;
    a fine adjustment element mounted on said screw member; and
    a connecting member mounted on said fine adjustment element for operatively connecting said fine adjustment element to an elongated coarse adjustment member extending between the crop row divider and the crop processing header, said connecting member shaped to permit axial movement of said coarse adjustment member in a first direction during coarse vertical adjustment of said crop divider, and wherein said screw member is oriented so that said connecting member and said fine adjustment element move in a direction substantially perpendicular to said first direction upon rotation of said screw member to thereby effect fine vertical adjustment of said crop divider.

2. A device as defined in claim 1 wherein said fine adjustment element comprises a nut threadably mounted on said screw member.

3. A device as defined in claim 2 wherein said connecting member comprises a ring fixedly secured to said nut.

4. A device as defined in claim 1 wherein said support member has a generally inverted J-shaped portion adapted to be secured to a frame member of said crop processing header.

5. A device as defined in claim 1 wherein said support member includes means for constraining said screw member against axial movement.

6. A device as defined in claim 5 wherein said support member further includes means for constraining said fine adjustment element against rotational movement, but permitting axial movement thereof.

7. A device as defined in claim 6 wherein said fine adjustment element comprises a nut threadably secured to said screw member.

8. In a crop processing header for a multi-row crop harvester, wherein said processing header has a frame and a plurality of laterally spaced crop dividers arranged across the front end thereof, said crop dividers each being pivotally mounted to a lower forward edge of the header frame, and an elongated, flexible member extending between a front, nose portion of the crop divider and the header frame for effecting coarse vertical adjustment of each crop divider, the improvement comprising:
    screw actuated means operatively engaging said elongated flexible member intermediate free ends thereof to move said member generally perpendicular to its normal orientation to thereby effect fine vertical adjustment of the crop divider.

9. The invention defined in claim 8 wherein said screw actuated means comprises a nut axially moveable along an elongated screw.

10. The invention defined in claim 9 wherein said elongated screw is freely rotatably mounted within an elongated support member attached to said header frame.

11. The invention defined in claim 9 wherein the nut engages the elongated flexible member through a connecting member fixedly secured thereto.

12. The invention defined in claim 11 wherein said connecting member comprises an annular ring.

13. The invention as defined in claim 10 wherein said support member is attached to said header frame adjacent an aperture in an upper housing portion of said header so that said elongated screw is accessible therethrough.

14. An adjustment tool for use with a crop divider pivotally mounted on a crop header wherein said crop divider is provided with coarse vertical adjustment means including an adjustable, elongated, flexible member extending between, and secured at opposite end to, the crop divider and the crop header, said tool comprising:
(a) mounting means for securing the tool to a frame member of said crop header;
(b) support means connected to said mounting means;
(c) fine adjustment means movably mounted on said support means; and
(d) connection means secured to said fine adjustment means for movement therewith, and adapted to engage said elongated flexible member at a location intermediate said opposite ends, so that, in use, the said fine adjustment means, acting through said connection means, acts directly on said elongated flexible member to provide precise vertical adjustment of said crop divider.

15. An adjustment tool as defined in claim 14 wherein said mounting means comprises an inverted J-shaped strap element and a screw fastener associated therewith.

16. An adjustment tool as defined in claim 15 wherein said support means is formed integrally with said mounting means.

17. An adjustment tool as defined in claim 14 wherein said fine adjustment means comprises an elongated bolt member and a nut member rotatably threaded thereon, said connection means being fixedly secured to the nut member.

18. An adjustment tool as defined in claim 17 wherein said support means includes means for substantially constraining said bolt member against axial movement, and means for substantially constraining said nut member against rotational movement so that, upon rotation of said bolt member, said nut member and said connection means move axially along the bolt member.

19. An adjustment tool as defined in claim 18 wherein said connection means comprises an annular ring adapted to receive therethrough said elongated flexible member at a point intermediate its ends whereby, in use, axial movement of said connection means alters the effective length of said elongated flexible member, causing pivotal movement of said crop divider with respect to said crop header.

20. A method of effecting precise vertical adjustment of crop dividers with respect to ground, wherein said crop dividers are pivotally mounted on a forward end of a crop header, each of said crop row dividers including a flexible coarse adjustment member attached at a first end to the crop divider and adjustably attached at a second end to the crop header, the method comprising:
(a) providing an adjustment tool which includes means for engaging the coarse adjustment member intermediate its ends;
(b) mounting the adjusting tool on a frame member of the crop header such that said engaging means is oriented for movement generally perpendicularly with respect to said flexible coarse adjustment member;
(c) actuating said engaging means to exert a force on said flexible coarse adjustment member so as to change its effective length and to cause said crop row divider to pivot about the front end of the header to thereby vertically adjust said crop divider with respect to the ground;
(d) repeating steps (a) through (c) for each crop divider associated with the crop header.

21. The method as defined in claim 20 wherein said adjustment tool includes a support member which rotatably mounts an elongated screw member, said support member further including means for mounting the adjustable tool on said frame member.

22. The method as defined in claim 21 wherein said flexible, coarse adjustment member comprises a chain and said engaging means comprises an annular ring threadably mounted for axial movement along said elongated screw member.

23. The method as defined in claim 22 wherein step (b) is further practiced by mounting said adjustment tool on said crop header frame member such that access is provided to said elongated screw externally and from above the crop header.

24. The method as defined in claim 22 wherein step (c) is practiced by rotating the elongated screw in a first direction to raise the crop row divider, and in a second direction to lower the crop row divider.

25. A device for fine vertical adjustment of a crop divider pivotally mounted on a crop processing header, said device comprising:
a support member adapted for attachment to a frame member on the crop processing header;
a screw member freely rotatably mounted on said support member, said support member including means for constraining said screw member against axial movement;
a fine adjustmet element mounted on said screw member; and
a connecting member for operatively connecting said fine adjustment element to a coarse adjustment member extending between the crop row divider and the crop processing header, wherein said support member further includes means for constraining said fine adjustment element against rotational movement, but permitting axial movement thereof.

26. A device as defined in claim 25 wherein said fine adjustment element comprises a nut threadably secured to said screw member.

27. An adjustment tool for use with a crop divider pivotally mounted on a crop header wherein said crop divider is provided with coarse vertical adjustment means in the form of an adjustable, elongated, flexible member extending between and secured at opposite ends to the crop divider and the crop header, said tool comprising:
(a) mounting means for securing the tool to a frame member of said crop header;
(b) support means connected to said mounting means;
(c) fine adjustment means movably mounted on said support means; and
(d) connection means secured to said fine adjustment means for movement therewith, and adapted for operative engagement with said coarse adjustment means, so that, in use, the said fine adjustment means, acting through said connection means, acts directly on said coarse adjustment means elongated flexible member to provide precise vertical adjustment of said crop divider, and wherein said fine adjustment means comprises an elongated bolt member and a nut member rotatably threaded thereon, said connection means being fixedly secured to the nut member.

28. An adjustment tool as defined in claim 27 wherein said support means includes means for substantially constraining said bolt member against axial movement, and means for substantially constraining said nut member against rotational movement so that, upon rotation of said bolt member, said nut member and said connection means move axially along the bolt member.

29. An adjustment tool as defined in claim 28 wherein said connection means comprises an annular ring adapted to receive therethrough said elongated flexible member at a point intermediate its ends whereby, in use, axial movement of said connection means alters the effective length of said elongated flexible member, causing pivotal movement of said crop divider with respect to said crop header.

* * * * *